United States Patent [19]

Nishi et al.

[11] Patent Number: 4,476,692
[45] Date of Patent: Oct. 16, 1984

[54] AUTOMOTIVE REFRIGERATION SYSTEM

[75] Inventors: Yasuyuki Nishi, Oobu; Masasi Takagi, Kariya; Masao Sakurai, Oobu, all of Japan

[73] Assignee: Nippondenso Co., Ltd., Kariya, Japan

[21] Appl. No.: 398,882

[22] Filed: Jul. 16, 1982

[30] Foreign Application Priority Data

Jul. 17, 1981 [JP] Japan .................. 56-112427

[51] Int. Cl.³ .............................................. F25B 1/00
[52] U.S. Cl. ................................. 62/228.5; 62/323.4; 417/310
[58] Field of Search ................... 417/310, 292; 62/175, 62/229, 228.5, 323.4; 236/1 EA, 80 R

[56] References Cited

U.S. PATENT DOCUMENTS

| | | | |
|---|---|---|---|
| 2,556,882 | 6/1951 | Minkler et al. | 62/228.5 |
| 3,495,418 | 2/1970 | Kapich | 62/228.5 X |
| 4,068,981 | 1/1978 | Mandy | 417/310 |
| 4,152,902 | 5/1979 | Lush | 236/1 EA |
| 4,342,199 | 8/1982 | Shaw et al. | 417/310 X |

Primary Examiner—William E. Wayner
Attorney, Agent, or Firm—Cushman, Darby & Cushman

[57] ABSTRACT

A refrigeration system for use in an automotive air conditioning system has a vane type variable displacement refrigerant compressor drivingly connectable by an electromagnetic clutch to an automotive engine and a refrigerant evaporator through which air is caused to flow by a blower. The compressor is provided with one or two unloading ports for releasing the refrigerant being compressed and with a valve member or members associated with the unloading port or ports. The air temperature just downstream of the evaporator is detected by a sensor which emits a signal to an electric circuit for actuating the valve member or members so that the unloading port or ports are selectively opened to vary the compressor displacement to provide a multistage compressor displacement control. The electric circuit is also operative to control the electromagnetic clutch to selectively connect and disconnect the compressor to and from the engine.

8 Claims, 14 Drawing Figures

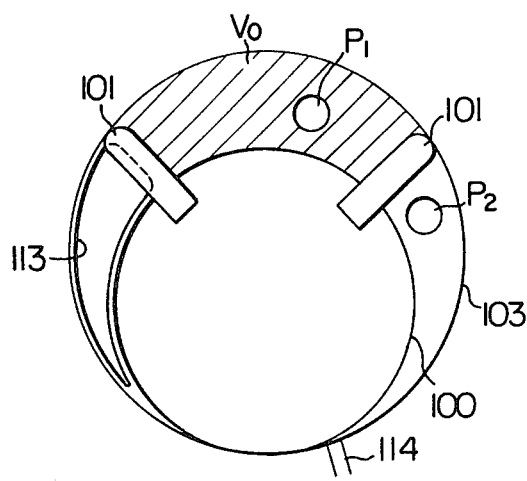
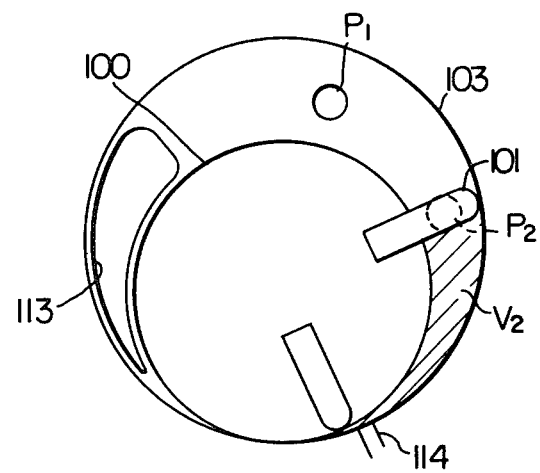
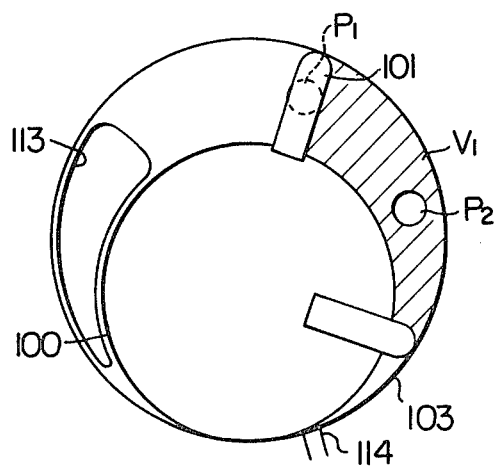

AUTOMOTIVE REFRIGERATION SYSTEM

BACKGROUND OF THE INVENTION

The present invention relates to a refrigeration system for use in an automotive air conditioning system and, more particularly, to a capacity control of such a refrigeration system.

BRIEF DESCRIPTION OF THE DRAWINGS

FIGS. 9A to 9C are diagrammatic crosssectional views of the compressor cylinder and rotor showing the rotor in different positions to illustrate the compressor displacement changes;

DESCRIPTION OF THE PRIOR ART

Figure 1:
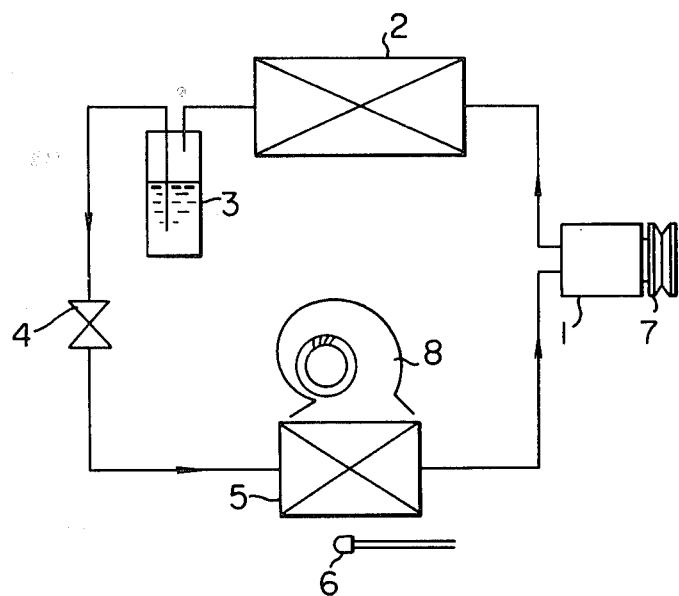
FIG. 1 is a block diagram of the refrigeration cycle of the prior art automotive air conditioner.

As will be seen from FIG. 1, a typical conventional automotive air conditioning system employs a vapor compression type refrigeration cycle consisting essentially of a compressor 1, a condenser 2, a receiver 3, an expansion valve 4 and an evaporator 5. Since the compressor 1 is driven by the automobile engine (not shown) through an electromagnetic clutch 7, the operation speed of the compressor is naturally increased as the engine speed becomes higher. In this conventional air conditioning system, it is often experienced that a frosting or icing takes place on the fins of the evaporator 5, as the surface temperature of the evaporator fins and thus the evaporation temperature of the refrigerant comes down below 0° C. due either to the increase in the operation speed of the compressor or to the reduction in the ambient air temperature. The frosting or icing on the fins reduces the rate of the air flow from a blower 8 through the evaporator 5, resulting in a reduction in the air cooling capacity.

Figure 2:
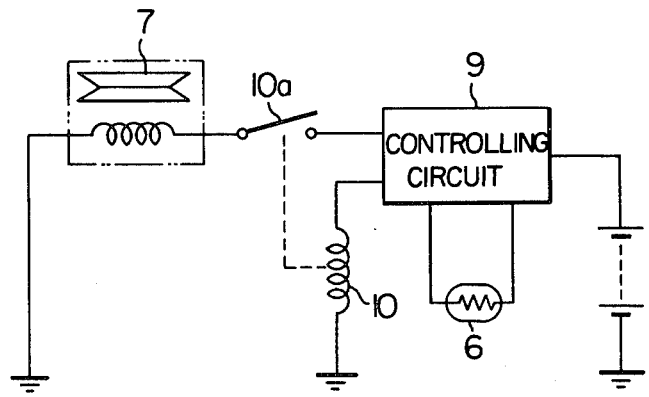
FIG. 2 is an electrical block diagram illustrating a capacity control system of the prior art refrigeration cycle shown in FIG. 1.

In order to prevent the frosting or icing on the evaporator fins or to control the air temperature in the automobile, therefore, the temperature of air just downstream of the evaporator 5 is detected by a temperature detector 6 such as a thermistor which is electrically connected to a controlling circuit 9 shown in FIG. 2 so that a relay 10 is controlled in accordance with the output from the temperature detector to open and close a relay contact 10a to engage or disengage the electromagnetic clutch 7, whereby the period of operation of the compressor is controlled to adjust the evaporation temperature of the refrigerant thereby to control the air temperature immediately downstream of the evaporator.

Figure 3:
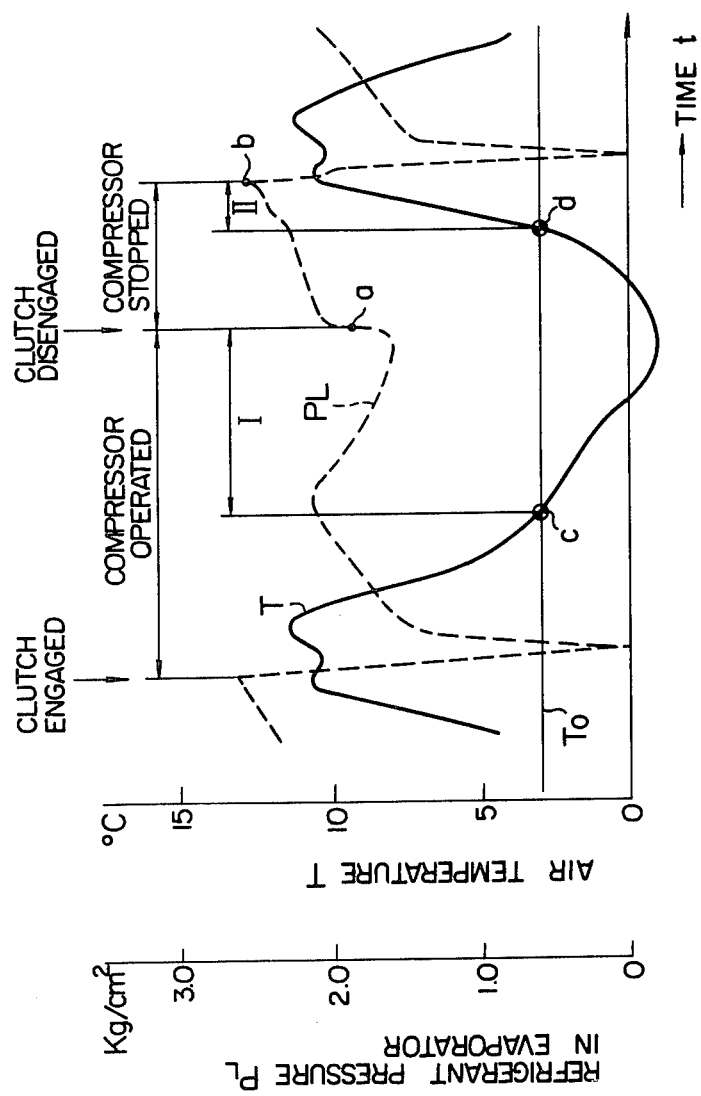
FIG. 3 graphically illustrates variations in the refrigerant pressure in an evaporator and in the air pressure immediately downstream of the evaporator, as obtained by the prior art capacity control system.

This arrangement, however, has the following drawback. Namely, when the cooling load is decreased or the operation speed of the compressor 1 is increased, the displacement of the compressor 1 and thus of the refrigeration cycle exceeds the cooling load or demand. In such a case, the air temperature T just downstream of the evaporator 5 is lowered and comes down below a set temperature To at a point (c), as shown in FIG. 3. However, a considerably long time period represented by I in FIG. 3 is required until the controlling circuit 9 is put into effect due to a large heat capacity of the temperature detector 6. In consequence, the air temperature T is further lowered for the time period I until a moment (a) at which the controlling circuit 9 starts to operate is reached. Thus, the air temperature is lowered to a level considerably lower than the set temperature To. The controlling circuit 9 starts to operate at the moment (a) to disengage the clutch 7 so that the compressor 1 stops. Then the expansion valve 4 is closed to stop the supply of the refrigerant to the evaporator 5. In consequence, the internal pressure $P_L$ in the evaporator 5 is raised to increase the area of super heating of the refrigerant with a resultant decrease in the effective heat transfer area of the evaporator 5. As a result, the air temperature T just downstream of the evaporator 5 is increased drastically and comes to exceed the set temperature at at moment (d). The rise of the air temperature T, however, is continued undesirably to a moment (b) at which the controlling circuit 9 starts operation, due to the presence of a time period II attributable to the heat capacity of the temperature detector 6. The operation of the controlling circuit 9 is started at the moment (b) to again engage the clutch 7 thereby to start the compressor 1 again. The above-described operation is repeated to control the air temperature T.

This repetitional operation involves the following problems:

(1) During the operation of the compressor 1, the displacement of the compressor 1 exceeds the demand but, when the compressor 1 is not operating, there occurs a reduction in the cooling capacity due to an increase in the area of superheating in the evaporator 5 because of lack of the refrigerant in liquid phase. In consequence, power is consumed wastefully.

(2) The air temperature just downstream of the evaporator is varied widely due to the discontinuous operation of the compressor to give an unpleasant feeling of cooling to the users.

(3) The repeated engagement and disengagement of the clutch adversely affects the durability of the clutch.

(4) When the clutch is brought into the engaging state, a comparatively large load torque or shock is imparted to the engine to deteriorate the smoothness of the engine operation.

SUMMARY OF THE INVENTION

It is a primary object of the present invention to provide an improved refrigeration system which is entirely free from the above-discussed problems.

It is another object of the present invention to provide an air conditioning system in which the improved refrigeration system referred to above is incorporated.

The automotive refrigeration system according to the present invention essentially comprises a variable capacity refrigerant compressor adapted to be drivingly connected and disconnected to and from an automotive engine by means of an electromagnetic clutch. The compressor includes means for varying the displacement of the compressor and is disposed in fluid-flow communication with a refrigerant evaporator of a refrigeration cycle. A condition related to the cooling operation of the evaporator is detected by a sensor which emits a signal. The refrigeration system further includes electric circuit means operative in response to the signal from the sensor means to actuate means for controlling the compressor displacement varying means so that the displacement of the compressor is varied in accordance with the sensor signal. The electric circuit means are further opearative to control the operation of the electromagnetic clutch.

The compressor may be of a vane type. The compressor displacement varying means may comprise at least one unloading port formed in the compressor and being adapted to release the refrigerant being compressed and a valve member operatively associated with the unloading port. The controlling means may comprise a pressure responsive actuator operatively connected to the valve member and a solenoid valve means adapted to be actuated by the electric circuit means to control the application of a pressure to the pressure responsive actuator. When the unloading port is opened by the valve member, the compression of the refrigerant in a working space in the compressor is not started until after the working space is moved out of communication with the unloading port. Thus, the displacement of the compressor is reduced from the maximum compressor displacement which is obtained when the unloading port or ports are all closed by the associated valve member or members. The valve member or members are opened and closed in accordance with the signal emitted by the sensor means to the electric circuit means so that the compressor displacement can be varied stepwise to provide a multi-stage displacement control. In the case where a single unloading port is employed, the system provides two stages of compressor displacement control, whereas the system can provide three stages of compressor displacement control in the case where two unloading ports are utilized. This multi-stage compressor displacement control is combined with the clutch engagement and disengagement control to provide an increased number of stages of compressor displacement control.

The sensor means may detect the air temperature just downstream of the evaporator or the temperature of the surface of either the evaporator fins or the refrigerant conduit. The sensor means may alternatively detect the pressure of the refrigerant in the evaporator.

The above and other objects, features and advantages of the present invention will be made apparent by the following description with reference to FIGS. 4 through 12 of the accompanying drawings.

DESCRIPTION OF PREFERRED EMBODIMENTS

The refrigeration system embodying the present invention basically employs a refrigeration cycle identical to the prior art refrigeration cycle discussed with reference to FIG. 1. Thus, the parts of the respective embodiments of the invention similar to those of the prior art refrigeration cycle are designated by the same reference numerals. Description of the refrigeration cycle itself is omitted accordingly.

Figure 4:
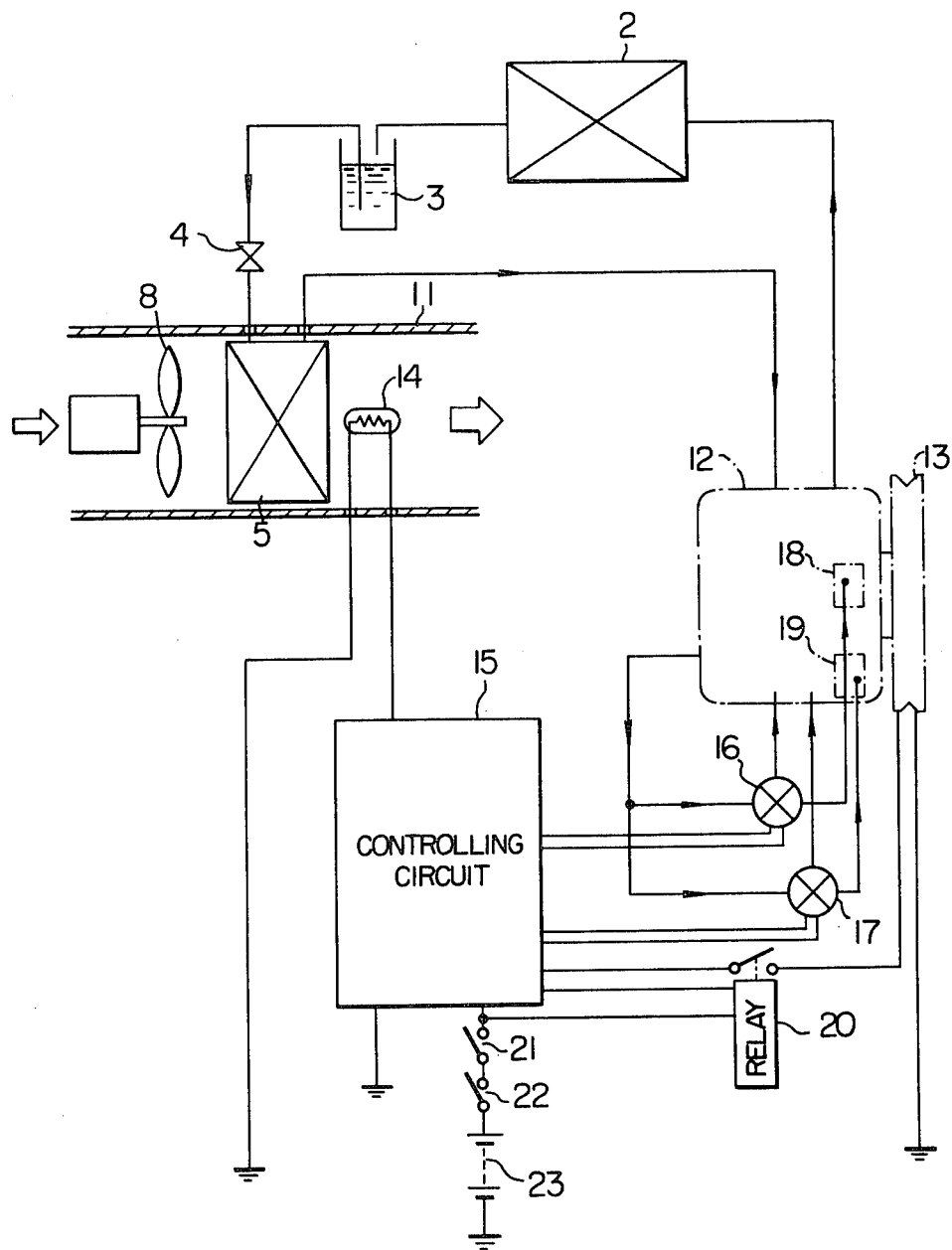
FIG. 4 is a diagrammatic illustration of an embodiment of the refrigeration system according to the present invention.

FIG. 4 shows the whole part of a first embodiment of the refrigeration system of the invention. The refrigeration system has an evaporator 5 and a motor-driven blower 8 disposed in a plastic duct 11 of an automotive air conditioner. The duct is communicated at its left-hand end with an ambient air intake opening and an internal air intake opening through a communication-switching box which is not shown. The duct is also communicated at its right-hand end with air outlets open to the passenger compartment, such as upper air outlets for cooled air and lower air outlets for warmed air. A heater unit, not shown, is disposed in the duct 11. A compressor 12 is connected at its suction or intake side to the outlet end of a refrigerant pipe extending from the discharge port of the evaporator 5. The compressor 12 is adapted to be driven by the engine of the automobile through an electromagnetic clutch 13. As will be described later, this compressor 12 is of variable capacity or discharge type including displacement varying means 18 and 19 for varying the capacity or displacement of the compressor. A temperature detector 14 consisting of a thermistor is adapted to detect the air temperature immediately downstream of the evaporator 5. The output signal of the temperature detector 14 is delivered to a controlling circuit 15 adapted to control solenoid-operated pilot valves 16 and 17 for actuating or controlling the compressor displacement varying means 18 and 19. A relay 20 is provided to control the electrical supply to the electromagnetic clutch 13 to thereby connect and disconnect the compressor 12 to and from an automotive engine, not shown. The operation of the air conditioner can be manually controlled by an air-conditioner switch 21 which is provided in series with an engine ignition switch 22 which in turn is provided in series with batteries 23 mounted on an associated automobile.

Figure 5:
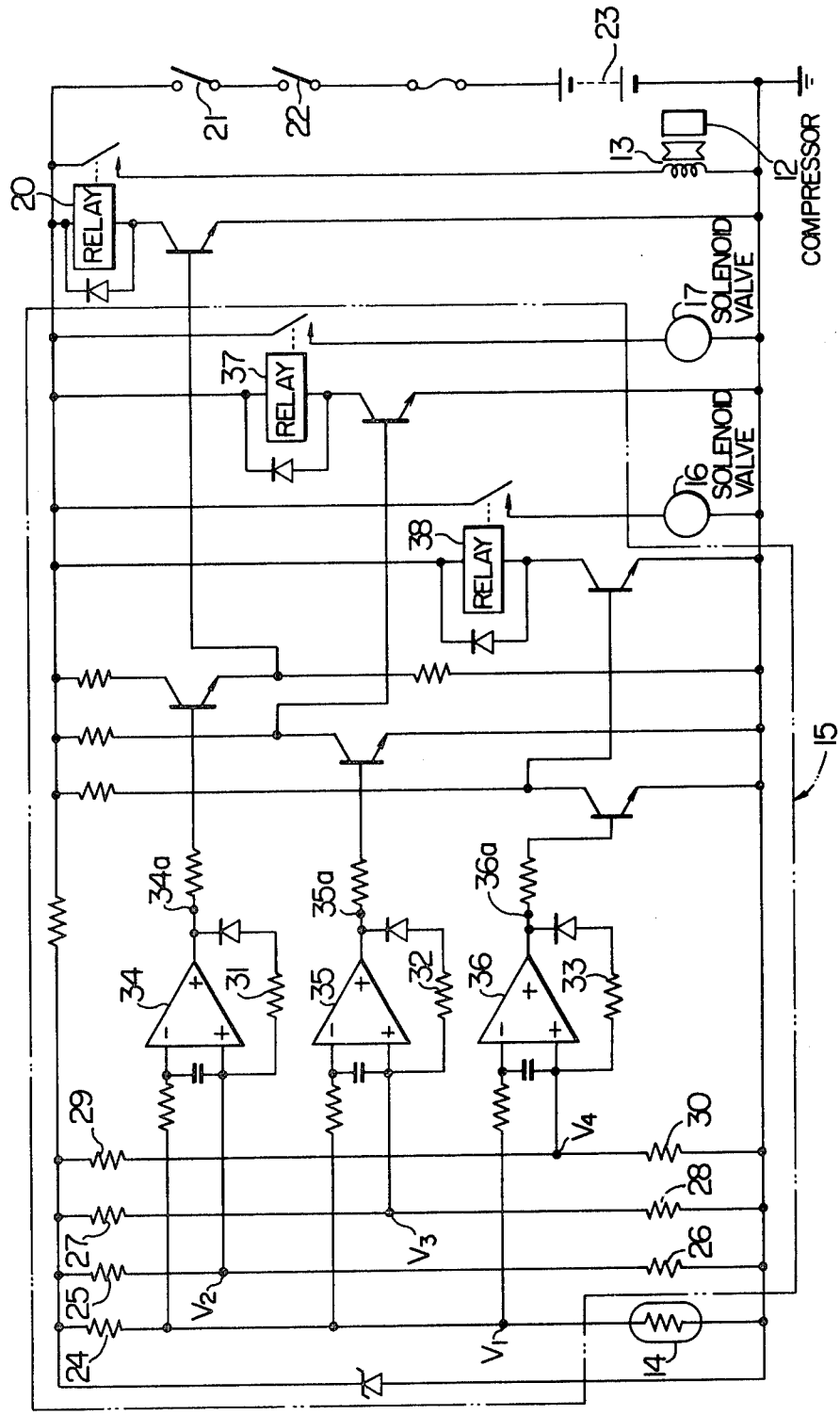
FIG. 5 shows an electric circuitry of the controlling circuit of the system shown in FIG. 4.
Figure 6:
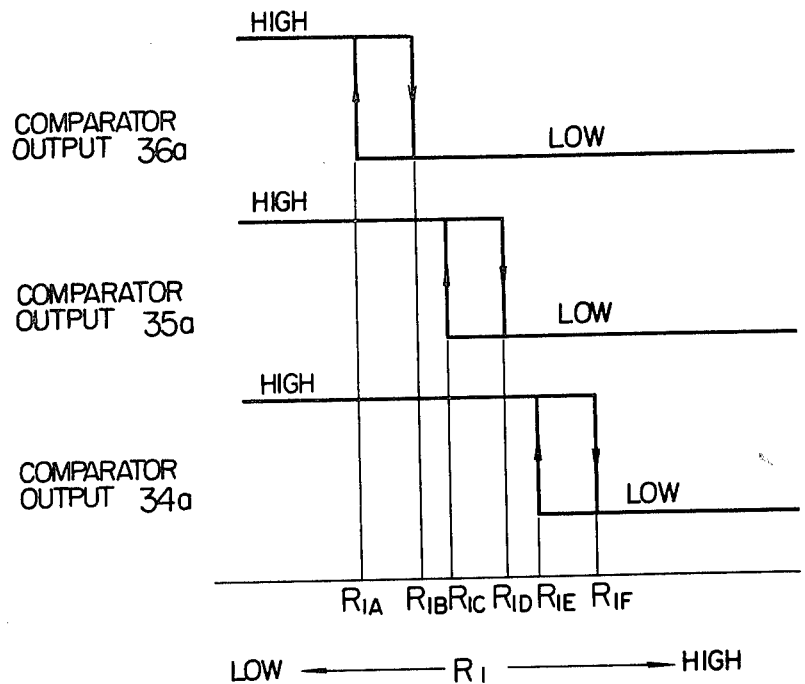
FIG. 6 illustrates the operation characteristics of the comparators of the electric circuitry shown in FIG. 5.

Referring now to FIG. 5, a practical example of the controlling circuit 15 includes comparators 34, 35 and 36 respectively operative to produce electrical outputs 34a, 35a and 36a which are respectively determined by an electric potential V1 dependent on a resistance R1 of the thermistor of the temperature detector 14, a reference potential V2 dependent on resistances of resistors 25, 26 and 31, a reference potential V3 dependent on resistances of resistors 27, 28 and 32 and a reference potential V4 dependent on resistances of resistors 29, 30 and 33. These reference potentials V2, V3 and V4 are predetermined such that V2 is higher than V3 which in turn is higher than V4 (Namely, V2 > V3 > V4). Variation in the thermistor resistance R1 causes the comparator outputs 34a, 35a and 36a to be varied in a manner shown in FIG. 6.

When the air temperature just downstream of the evaporator 5 is relatively high, the thermistor resistance R1 is at a level smaller or lower than R1B. At this time, the comparator outputs 34a, 35a and 36a are at their "High" levels, so that the relay 20 is in its "ON" state while relays 37 and 38 included in the controlling circuit 15 are both in "OFF" states. Thus, the electromagnetic clutch 13 is engaged to drivingly connect the compressor 12 to the engine and the solenoid valves 16 and 17 are closed to cause the compressor to be operated at its maximum (100%) displacement for the reasons to be made apparent later.

When the air temperature just downstream of the evaporator 5 is lowered and the thermistor resistance R1 is increased to the level R1B, the comparator output 36a will become "Low" level to switch the relay 38 on so that the solenoid valve 16 is energized and opened. In this case, the compressor 12 is operated at a lowered displacement level which is preferably equal to from 30% to 50% of the full or maximum displacement capacity. This lowered compressor displacement, however, may alternatively be as high as 70% of the maximum compressor displacement.

When the air temperature downstream of the evaporator 5 is further lowered and thermistor resistance R1 is increased to a level R1D, the comparator outputs 36a and 35a both become "Low" levels to switch the relays 38 and 37 on so that the solenoid valves 16 and 17 are both energized and opened to cause the compressor to be operated at a further lowered displacement level which is preferably equal to from 10% to 20% of the maximum displacement. The further lowered displacement level may alternatively be as high as 30% of the maximum compressor displacement.

When the air temperature is still further lowered and the thermistor restance R1 is further increased to a level R1F, the outputs 36a, 35a, and 34a of the three comparators all become "Low" levels. In this case, the relay 20 is switched off to deenergize the electromagnetic clutch 13 so that the compressor 12 is disconnected from the engine and is stopped.

Figure 7:
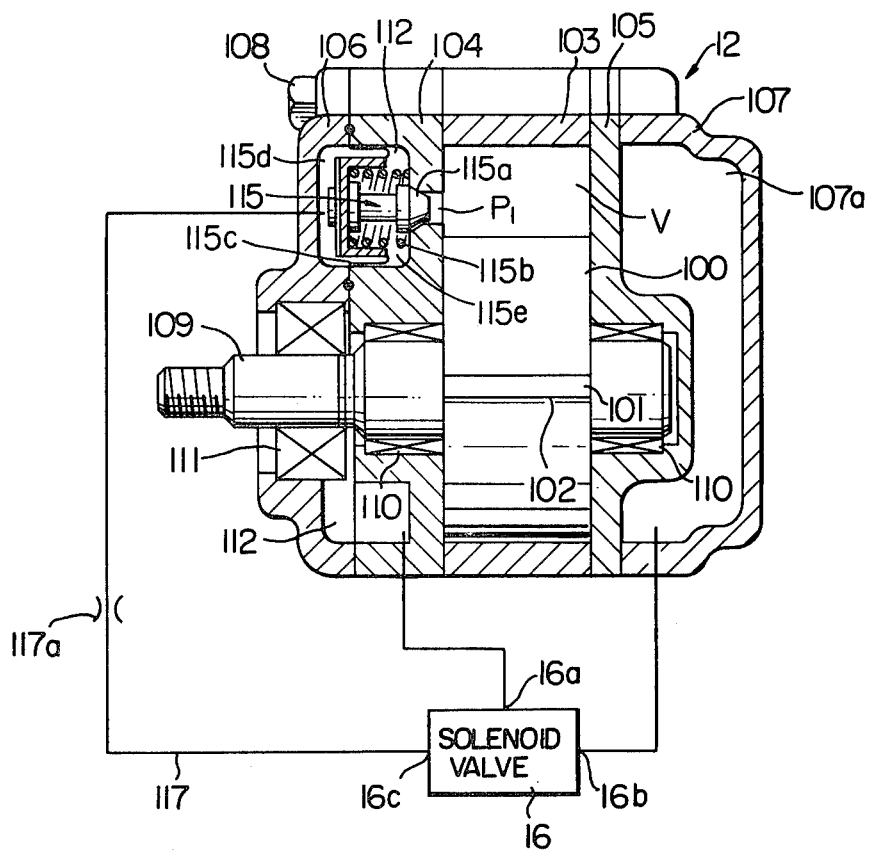
FIG. 7 is an axial sectional view of the compressor shown in FIG. 4.
Figure 8:
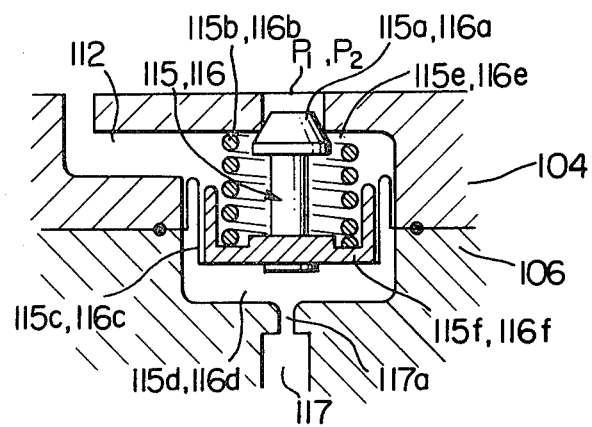
FIG. 8 is an enlarged fragmentary sectional view of the compressor showing the structural details of an on-off valve shown in FIG. 7.

Referring now to FIGS. 7-9, the compressor 12 includes a cylindrical rotor 100 carrying a plurality of vanes 101 mounted for radial sliding movement in radial grooves 102 formed in the outer peripheral surface of the rotor. Two vanes 101 only are shown in FIGS. 9A-9C but it can be appreciated by those in the art that in fact the rotor 100 carries four vanes arranged at equal angular intervals. The rotor 100 is disposed eccentrically in a cylinder 103 having an inner peripheral surface which limits the radial outer movements of respective vanes 101 and with which the vanes are in slidable contact at their outer ends. Front and rear end plates 104 and 105 are secured to the opposite ends of the cylinder 103. The rotor 100 and the vanes 101 are axially dimensioned such that their opposite axial ends are spaced from the end plates 104 and 105 so that very small gaps are defined therebetween.

The rotor 100, vanes 101, cylinder 103 and front and rear end plates 104 and 105 cooperate together to define variable working spaces V the volumes of which are varied as the rotor 100 is rotated with the vanes 101. The cylinder 103, front and rear end plates 104 and 105 and a pair of housing members 16 and 107 are secured together by bolts 108 to form a unitary structure. The rotor 100 is rigidly mounted on a shaft 109 which in turn is rotatably mounted on the front and rear end plates 104 and 105 by means of bearings 110 and adapted to be driven by the engine through torque transmission means including the electromagnetic clutch 13 referred to above. A seal 111 is provided between the shaft 109 and the housing member 106.

The front end plate 104 and the housing member 106 cooperate to define therebetween an intake chamber 112 connected to the evaporator 5 to receive the refrigerant therefrom. The front end plate 104 defined therein an intake port 113 (see FIGS. 9A-9C) through which the intake chamber 112 is adapted to be communciated with successive working spaces V so that the refrigerant is sucked from the intake chamber 112 into successive working spaces V. FIG. 9A illustrates one working space V as being charged with the refrigerant at an intake pressure. The refrigerant in the working space V is gradually compressed as the volume of the working space V is decreased. When the working space V is brought to a maximum compression position, the compressed refrigerant is discharged from the working space V through a discharge port 114 in the cylinder 103 and through a discharge valve (not shown) into a discharge chamber 107a defined between the housing member 107 and the rear end plate 105. The discharged refrigerant is then recirculated from the discharge chamber 107a to the condenser 2 of the refrigeration cycle.

The front end plate 104 is formed therein with a pair of unloading ports P1 and P2 disposed at angularly spaced points to communicate the intake chamber 112 with working spaces V. A pair of on-off valves 115 and 116 (only one of which is shown in FIG. 5) are provided to close and open the unloading ports P1 and P2, respectively. These valves 115 and 116 have the same structure which will be described later.

When the unloading port P1 is opened by the valve 115, the working space V which is communication with the unloading port P1 is not capable of performing its compression operation until after this working space is moved out of communication with the port P1. Thus, this working space commences its compression operation from a volume V1, as shown in FIG. 9B. It will be seen from the comparison between FIGS. 9A and 9B that the initial or compression-starting volume V1 in the case of the unloading port P1 being opened by the valve 115 is much smaller than the initial or compression-starting volume Vo in the case of the port P1 being closed by the valve 115. In the illustrated embodiment of the invention, the unloading port P1 is positioned such that the volume V1 is approximately 70% of the volume Vo.

The second unloading port P2 is positioned such that, when this port is opened by the valve 116, the initial or compression-starting volume V2 is approximately 30% of the volume Vo, as will be seen from the comparison between FIGS. 9A and 9C.

Referring to FIG. 8, the valves 115 and 116 respectively have valve members 115a and 115b movable into and out of sealing engagement with peripheral edges of the unloading ports P1 and P2, springs 115b and 116b resiliently biasing these valve members 115a and 116a in valve-opening directions, bellow-phragms 115c and 116c adapted to actuate the valve members 115a and 116a to the valve-closed positions and cup-shaped members 115f and 116f acting as spring retainers and guides for the bellow-phragms. The valve members 115a and 116a are both made of a material having a high mechanical strength, such as a stainless steel. The outer surfaces of the cup-shaped members 115f and 116f and the bellow-phragms 115c and 116c cooperate with the housing member 106 of the compressor to define pilot pressure chambers 115d and 116d each of which is connected by a pilot pressure passage 117 to the solenoid-operated pilot valve 16 or 17 to be described later. The passage 17 is provided therein with a restriction 117a which is operative to prevent the pilot pressure chamber 115d or 116d from being subjected to sudden increase in the pilot pressure applied thereto. The inner surfaces of the cup-shaped members 115f and 116f and the bellow-phragms 115c and 116c cooperate with the front end plate 104 to define chambers 115e and 116e which are communicated with the intake chamber 112 of the compressor 12.

The unloading port P1 and the valve 115 cooperate to constitute the compressor displacement varying means 18 while the other unloading port P2 and the valve 116 cooperate to constitute the other compressor displacement varying means 19.

The pilot valve 16 is operative to control the actuator for the valve 115 associated with the unloading port P1 while the other pilot valve 17 is operative to control the actuator for the other valve 116 associated with the other unloading port P2.

Figure 10:
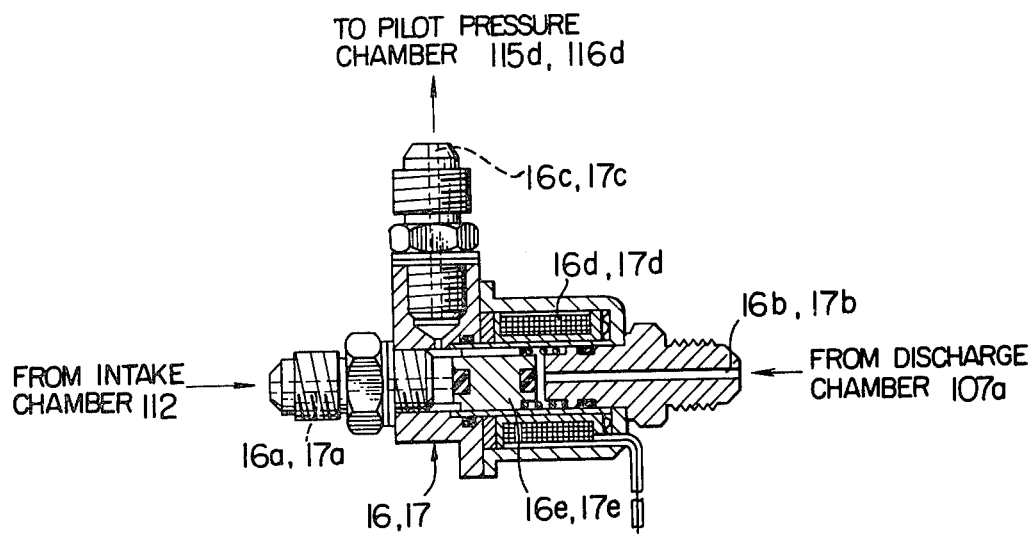
FIG. 10 is a partial sectional view of a solenoid valve used as a pilot valve for controlling the on-off valve shown in FIGS. 7 and 8.

The structural details of the pilot valves 16 and 17 are shown in FIG. 10. These valves 16 and 17 are of the same structure and respectively include compressor intake pressure inlet ports 16a and 17a pneumatically connected to the compressor intake chamber 112, compressor discharge pressure inlet ports 16b and 17b pneumatically connected to the compressor discharge chamber 107a and pilot pressure outlet ports 16c and 17c penumatically connected to the pilot pressure chambers 115d and 116d in the compressor, as shown in FIG. 8. The pneumatic connections between the pilot valve 16 to the compressor 12 are shown in FIG. 7. The other pilot valve 17 has similar pneumatic connection to the compressors although these connections are not shown. The respective pilot valves 16 and 17 further include coils 16d and 17d adapted to be electrically energized and deenergized to electromagnetically actuate valve members 16e and 17e of a magnetic material so that the positions of the valve members 16e and 17e with respect to the pressure inlet ports 16a, 17a and 16b, 17b are selectively changed to communicate the pilot pressure outlet ports 16c and 17c either with the compressor intake chamber 112 through the pressure inlet ports 16a and 17a or with the compressor discharge chamber 107a through the pressure inlet ports 16b and 17b.

When the pilot pressure outlet ports 16c and 17c are communicated with the compressor intake chamber 112, the pilot pressure chamber 115d and 116d are at the compressor intake pressure, so that the springs 115b and 116b move the valve members 115a and 116a away from the unloading ports P1 and P2 to allow working spaces V to be communicated with the compressor intake chamber 112. On the other hand, when the pilot pressure outlet ports 16c and 17c of the pilot valves are communicated with the compressor discharge chamber 107a, the compressor discharge pressure is introduced into the pilot pressure chambers 115d and 116d so that the valve members 115a and 116a are moved against the springs 115b and 116b into sealing engagement with the peripheral edges of the unloading ports P1 and P2 to interrupt the communication between the compressor intake chamber 112 and the working spaces V.

In order to prevent the solenoid-operated pilot valves 16 and 17 from being overheated, they are disposed at or adjacent to the points of the compressor 12 which are kept at relatively low temperature levels, such as a service valve (not shown) or the front housing member 106.

The operation of the system described above will be discussed hereunder. When the air temperature just downstream of the evaporator 5 is at a high level and the resistance R1 of the thermistor of the temperature detector 14 is less than the level R1B, the electrical supplies to the pilot or solenoid valves 16 and 17 are interrupted to cause the valve members 16e and 17e to block the compressor intake pressure inlet ports 16a and 17a so that the compressor discharge pressure is fed through the pressure inlet ports 16b and 17b and the pilot pressure outlet ports 16c and 17c into the pilot pressure chambers 115d and 116d. Thus, the unloading ports P1 and P2 are closed by the valves 115 and 116 to cause the compressor 12 to be operated at its maximum capacity or displacement.

When the air temperature just downstream of the evaporator 5 is lowered and the thermistor resistance R1 is increased to a level R1B, the coil 16d of the pilot valve 16 is electrically energized to actuate the valve member 16e to a position in which the compressor intake pressure inlet port 16a is unblocked and communicated with the pilot pressure outlet port 16c. Thus, the compressor intake pressure is now applied to the pilot pressure chamber 115d to cause the valve member 115a of the valve 115 to be moved by the spring 115b to a valve-open position. Thus, the unloading port P1 is now opened to reduce the compressor displacement to a level equal to from 30% to 50% of the maximum displacement.

When the air temperature just downstream of the evaporator 5 is further lowered and the thermistor resistance R1 is increased to a level R1D, the pilot or solenoid valve 17 is also electrically energized to open the valve 116 for thereby opening the pilot port P2. Thus, the ports P1 and P2 are both opened at this time. Accordingly, the compressor displacement is reduced to a level equal to from 10% to 20% of the maximum displacement.

When the air temperature just downstream of the evaporator is further lowered and the thermistor resistance R1 is increased to a level R1F, the electromagnetic clutch 13 is disengaged to disconnect the compressor from the engine so that the compressor operation is stopped.

As described, the displacement capacity of the compressor 12 can be varied with three stages; namely a 100% (maximum) displacement stage, a 30-50% displacement stage and a 10-20% displacement stage. This three stage displacement control is combined with the clutch disengagement control for the interruption of the compressor operation so that the air temperature just downstream of the evaporator 5 can be adjusted to be substantially at a predetermined level.

Figure 11:
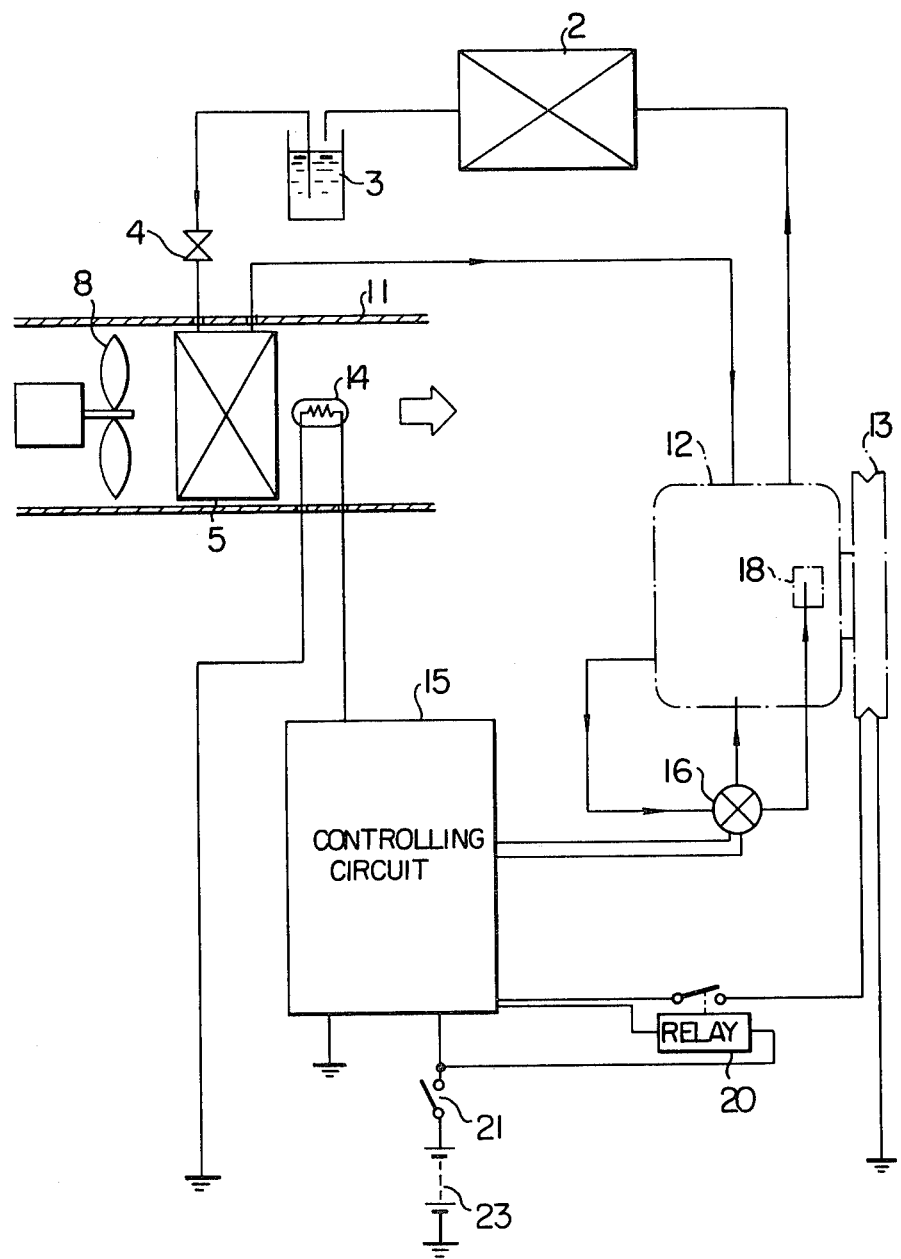
FIG. 11 is a view similar to FIG. 4 but illustrates a second embodiment of the refrigeration system according to the present invention.
Figure 12:
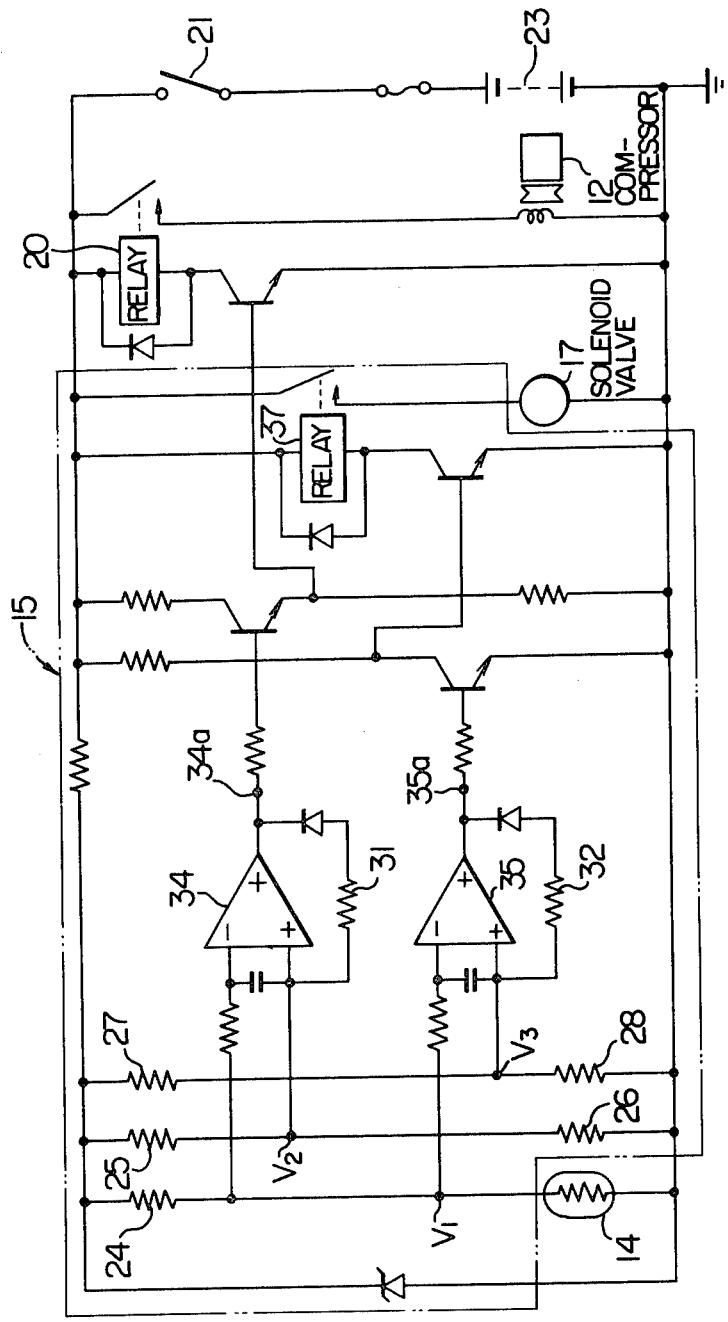
FIG. 12 is a view similar to FIG. 5 but illustrates the controlling electric circuitry of the refrigeration system shown in FIG. 11.

The compressor displacement may alternatively be varied by two stages as shown in FIGS. 11 and 12 wherein the parts and elements the same as those of the first embodiment are designated by the same reference numerals. In this alternative embodiment, the compressor 12 is provided with a single compressor displacement varying means 18 and thus with a single unloading port (not shown) corresponding to the port P1 or P2 of the first embodiment. Prrferably, this unloading port is so positioned that, when the port is opened, the compressor displacement is reduced to a level equal to 20% to 50% of the maximum displacement. The controlling circuit 15 shown in FIG. 12, therefore, is provided with a single solenoid valve 17 associated with the compressor displacement means 18 and a single relay 37. In other words, the solenoid valve 18, the relay 38, the comparator 36 and the related electric elements of the circuit shown in FIG. 5 are not included in the circuit shown in FIG. 12.

In the described embodiments of the invention, the air temperature just downstream of the evaporator is detected for the displacement control of the compressor. However, the temperature detector or sensor may alternatively be disposed to detect the temperature of the refrigerant in the evaporator, the temperature of the evaporator fins or the temperature of the refrigerant conduits. The temperature sensor may be replaced by a pressure sensor for detecting the refrigerant pressure within the evaporator.

The resistor 24 may be replaced by a variable resistor (not shown) which is so disposed as to be easily adjustable by an operator so that the compressor displacement control can be utilized not only to prevent the frosting of the evaporator 5 but also to control the temperature in the passenger compartment of an associated automobile.

The valves 115 and 116 of the compressor displacement varying means 18 and 19 may be replaced by another type of valves including valve members slidable on the front end plate 104 to selectively close and open the unloading ports P1 and P2. In this case, the pressure-responsive actuators may be replaced by another type of actuators such as servo motors.

The compressor 12 used in the described embodiments is not limited to the vane type described and may alternatively be of another type such as swash plate type.

It will be appreciated from the foregoing description that the refrigeration system according to the present invention provides a multi-stage compressor displacement control so that the compressor displacement can be automatically varied stepwise to match with variable demand or cooling load to advantageously provide pleasant air-conditioning, minimize the power required for the compressor operation and increase the durabilities of the compressor and the electromagnetic clutch.

What is claimed is:

1. An automotive refrigeration system comprising:
a variable capacity vane-type refrigerant compressor including an intake chamber and a discharge chamber;
electromagnetic clutch means for drivingly connecting and disconnecting said compressor to and from an automotive engine;
means, in said compressor, for varying the displacement of said compressor, said compressor displacement varying means comprising at least one unloading port formed in said compressor and being adapted to release the refrigerant being compressed therein and a valve member operatively associated with said unloading port;
a refrigerant evaporator disposed in fluid-flow commuication with said compressor;
sensor means operative to detect a condition related to the cooling operation of said evaporator;
means for controlling said compressor displacement varying means; and
electric circuit means operative in response to a signal from said sensor means to actuate said control means for thereby varying the displacement of said compressor and to control the operation of said electromagnetic clutch means to thereby provide a multi-stage compressor displacement control,
wherein said controlling means comprises a pressure responsive actuator operatively connected to said valve member and a solenoid valve means adapted to be actuated by said electric circuit means to control the application of a pressure to said pressure responsive actuator,
wherein said solenoid valve means is provided with a first port pneumatically connected to said pressure responsive actuator and third and fourth ports pneumatically responsive to said compressor intake and discharge chambers, respectively, said solenoid valve means including a solenoid-operated valve member movable to selectively communicate said first port with said first and third ports.

2. An automotive refrigeration system as claimed in claim 1, wherein said compressor displacement varying means comprise two unloading ports and valve members operatively associated with said unloading ports, one of said unloading ports being disposed at a leading point relative to the other unloading port and the other unloading port being disposed at a trailing point relative to said one unloading port, and wherein said compressor and said unloading ports are arranged such that, when said one unloading port is opened by the associated valve member, the compressor displacement is reduced to a level substantially equal to from 30 to 50% of the maximum compressor displacement and such that, when said two unloading ports are both opened by said valve members, the compressor displacement is reduced to a level substantially equal to from 10 to 20% of the maximum compressor displacement.

3. An automotive refrigeration system as claimed in claim 1, wherein said compressor displacement varying means comprises a single unloading port and a valve member operatively associated therewith and wherein said compressor and said unloading port are arranged such that, when said unloading port is opened by said valve member, the compressor displacement is reduced to a level substantially equal to from 20 to 50% of the maximum compressor displacement.

4. An automotive refrigeration system as claimed claim 1 further including means for causing air to flow in heat exchange relationship to the refrigerant in said evaporator, and wherein said sensor means comprises a temperature sensor positioned to detect the temperature of the air downstream of said evaporator.

5. An automotive refrigeration system comprising:
a variable capacity refrigerant compressor;
an electromagnetic clutch means operative for drivingly connecting and disconnecting said compressor to and from an automotive engine;
means in said compressor for varying the displacement of said compressor;
a refrigerant evaporator disposed in fluid-flow communication with said compressor;
sensor means operative to detect a condition related to the cooling operation of said evaporator;
means for controlling said compressor displacement varying means;
electric circuit means operative in response to a signal from said sensor means to actuate said controlling means for thereby varying the displacement of said compressor and to control the operation of said electromagnetic clutch means to thereby provide a multi-stage compressor displacement control,
wherein said compressor displacement varying means comprises at least one unloading port formed in said compressor and is adapted to release the refrigerant being compressed therein and a valve member operatively associated with said unloading port, wherein said controlling means comprises a pressure responsive actuator operatively connected to said valve member and a solenoid valve means adapted to be actuated by said electric circuit means to control the application of a pressure to said pressure responsive actuator, wherein said compressor includes an intake chamber and a discharge chamber, and wherein said solenoid valve means is provided with a first port pneumatically connected to said pressure responsive actuator and second and third ports pneumatically connected to said compressor intake and discharge chambers, respectively, and a solenoid-operated valve member movable to selectively communicate said first port with said second and third ports.

6. An automotive refrigeration system as claimed in claim 5 wherein said compressor displacement varying means comprises two unloading ports and valve members operatively associated with said unloading ports, one of said unloading ports being disposed at a leading point relative to the other unloading port and the other unloading port being disposed at a trailing point relative to said one unloading port, and wherein said compressor and said unloading ports are arranged such that, when said one unloading port is opened by the associated valve member, the compressor displacement is reduced to a level substantially equal to from 30 to 50% of the maximum compressor displacement and such that, when said two unloading ports are both opened by said valve members, the compressor displacement is reduced to a level substantially equal to from 10 to 20% of the maximum compressor displacement.

7. An automotive refrigeration system as claimed in claim 5 wherein said compressor displacement varying means comprises a single unloading port and a valve member operatively associated therewith and wherein said compressor and said unloading port are arranged such that, when said unloading port is opened by said valve member, the compressor displacement is reduced to a level substantially equal to from 20 to 50% of the maximum compressor displacement.

8. An automotive refrigeration system as claimed in claim 5 further including means for causing air to flow in heat exhange relationship to the refrigerant in said evaporator, and wherein said sensor means comprises a temperature sensor positioned to detect the temperature of the air downstream of said evaporator.

* * * * *